United States Patent
Di Stefano

(10) Patent No.: US 6,398,159 B1
(45) Date of Patent: Jun. 4, 2002

(54) ARIAL DISK

(76) Inventor: Alfonso Di Stefano, 1413 Wayburn Rd., Grosse Pointe Park, MI (US) 48230

( * ) Notice: Subject to any disclaimer, the term of this patent is extended or adjusted under 35 U.S.C. 154(b) by 0 days.

(21) Appl. No.: 09/834,126

(22) Filed: Apr. 12, 2001

(51) Int. Cl.[7] .............................................. B64C 39/06
(52) U.S. Cl. .................... 244/17.11; 244/6; 244/7 A; 244/8; 244/12.2; 244/17.23; 244/23 C
(58) Field of Search .................... 244/17.11, 6, 7 A, 244/7 B, 8, 12.2, 17.23, 23 C, 17.13, 17.15

(56) References Cited

U.S. PATENT DOCUMENTS

| | | | |
|---|---|---|---|
| 3,514,053 A | 5/1970 | McGuinness | 244/12 |
| 3,946,970 A | 3/1976 | Blankenship | 244/23 C |
| 4,075,781 A | 2/1978 | Hill, II et al. | 46/74 D |
| 4,077,155 A | 3/1978 | Bruntmyer | 46/74 R |
| 4,182,073 A | 1/1980 | Tabet | 46/74 D |
| 4,195,800 A | 4/1980 | Wallace | 244/8 |
| 4,214,720 A | 7/1980 | DeSautel | 244/12.2 |
| 4,315,629 A | 2/1982 | English | 273/425 |
| 4,515,570 A | 5/1985 | Beltran | 446/47 |
| 4,752,267 A | 6/1988 | Layman | 446/46 |
| 4,778,128 A | 10/1988 | Wright et al. | 244/23 C |
| 4,846,749 A | 7/1989 | Petko | 446/36 |
| 4,976,395 A | * 12/1990 | von Kozierowski | 244/12.2 |
| 4,980,684 A | * 12/1990 | Paterson et al. | 244/17.11 |
| 5,072,892 A | * 12/1991 | Carrington | 244/23 C |
| 5,195,916 A | 3/1993 | Her | 446/46 |
| 5,213,284 A | * 5/1993 | Webster | 244/23 C |
| 5,240,204 A | 8/1993 | Kunz | 244/6 |
| 5,259,571 A | * 11/1993 | Blazquez | 244/12.2 |
| D346,626 S | 5/1994 | St. Lawrence | D21/86 |
| 5,324,223 A | 6/1994 | Yang | 446/46 |
| 5,351,911 A | 10/1994 | Neumayr | 244/23 C |
| 5,520,565 A | 5/1996 | Ulysse | 446/46 |
| D386,223 S | 11/1997 | Imai | D21/86 |
| 5,853,311 A | 12/1998 | Bartholomew | 446/48 |
| 5,984,753 A | 11/1999 | Perez | 446/46 |
| 6,016,991 A | 1/2000 | Lowe, Jr. | 244/5 |
| 6,062,508 A | 5/2000 | Black | 244/8 |

* cited by examiner

*Primary Examiner*—J. Woodrow Eldred
(74) *Attorney, Agent, or Firm*—Thomas W. Saur, Esq.

(57) ABSTRACT

An aircraft comprising a body and a plurality of disks rotatably coupled to the body. The disks may be configured to (i) rotate in the same or different directions, (ii) rotate at similar and/or different speeds, and (iii) provide lift and/or stability to flight of the aircraft.

21 Claims, 4 Drawing Sheets

ARIAL DISK

FIELD OF THE INVENTION

The present invention relates to winged aircraft generally and, more particularly, to an arial disk.

BACKGROUND OF THE INVENTION

In order for conventional winged aircraft to stay in flight, airspeed and altitude must be maintained. Significant airspeed is needed to generate the lift required to maintain altitude. When airspeed is insufficient to generate lift, the aircraft will lose altitude. The loss of altitude can result in a crash. Since the aircraft operator is often attempting to maintain or increase airspeed in the time immediately proceeding a crash, significant damage to the aircraft and injury and/or loss of life usually result. Conventional attempts to reduce the airspeed were required to provide lift by design techniques such as short, wide wings that can result in low efficiency aircraft. The conventional solutions do not significantly reduce crash damage.

Additionally, conventional winged aircraft can only develop lift when flying rapidly in a forward direction. As a result, conventional winged aircraft have limited maneuverability for avoiding a collision.

It would be desirable to have a method and/or apparatus for winged aircraft that would (i) provide lift without forward motion, (ii) aid maneuverability, and/or (iii) detect when airspeed and/or other conditions are insufficient to maintain flight and provide a safe mode for landing.

SUMMARY OF THE INVENTION

The present invention concerns an aircraft comprising a body, a number of air foils, and a plurality of disks. The disks may be rotatably coupled to the body and configured to (i) rotate in the same and/or different directions, (ii) rotate at similar and/or different speeds. The air foils may be configured to provide lift and control in a first mode and the disks are configured to provide lift and/or stability to the aircraft in a second mode.

Objects, features and advantages of the present invention include providing an arial disk that may (i) provide stable flight, (ii) detect when a crash is imminent, (iii) have a controlled descent during loss of power or airspeed, (iv) reduce aircraft damage due to crash, (v) reduce occupant injury and/or loss of life due to crash, (vi) provide improved maneuverability, (vii) be implemented in commercial, personal, and/or military aircraft, (viii) be implemented as a toy aircraft, and/or (ix) be economical.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
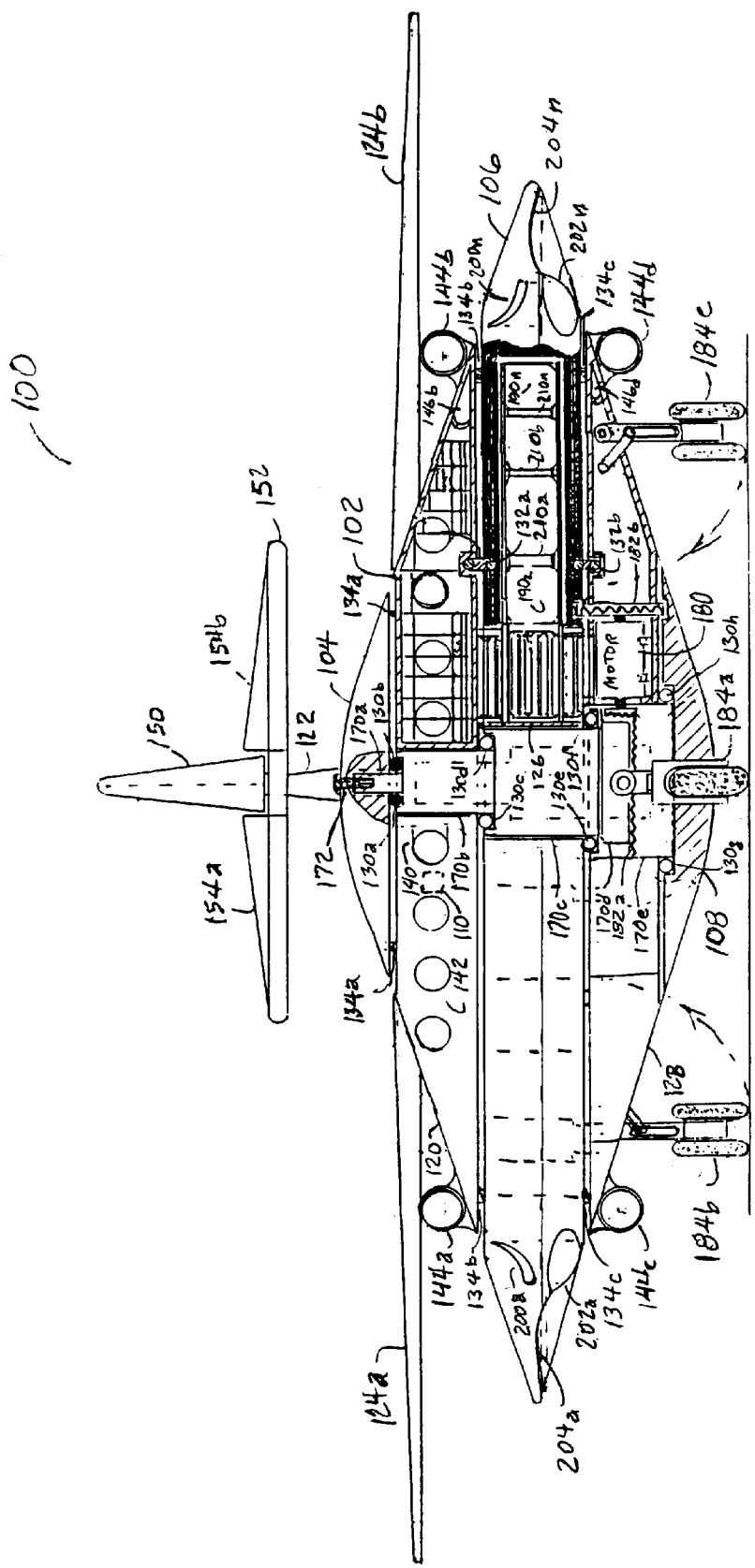
FIG. 1 is a diagram illustrating a partial cutaway front view of a preferred embodiment of the present invention.
Figure 2:
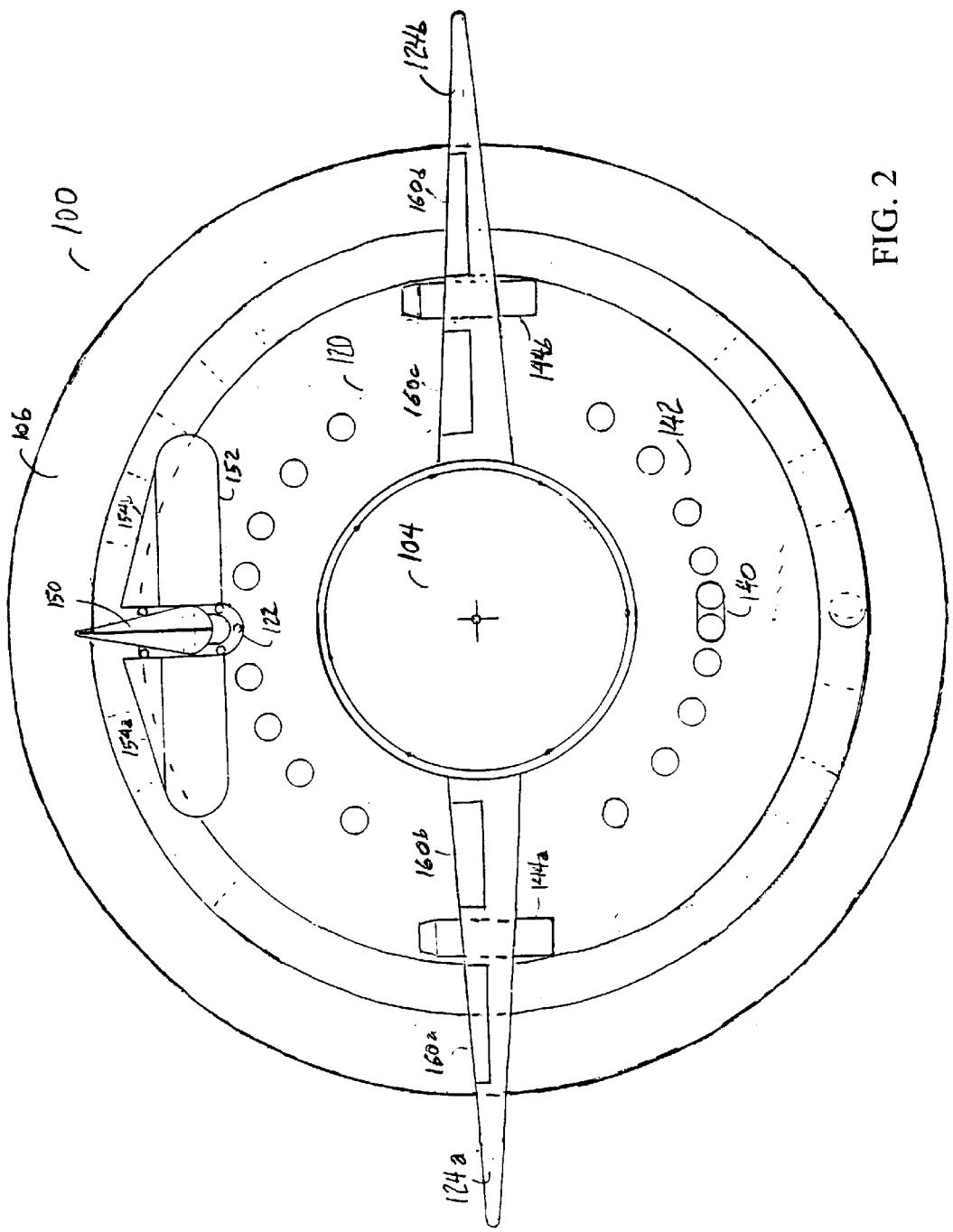
FIG. 2 is a diagram illustrating a top view of the present invention.

Referring to FIGS. 1 and 2, an aircraft 100 illustrating a preferred embodiment of the present invention is shown. In one example, the aircraft 100 may comprise a body 102, a disk 104, a disk 106, a disk 108, and a crash detection apparatus 110. The aircraft 100 may be implemented as an arial disk. In one example, the aircraft 100 may be implemented as a compound aircraft (e.g., a winged and disk aircraft). The disks 104, 106 and 108 may be rotatably coupled to the body 102. The disk 104 may form, in one implementation, an upper surface of the body 102. The disk 106 may be implemented as an annular ring having an upper and a lower surface that are substantially parallel with an upper and a lower surface of the body 102. The body 102 may be centrally disposed within the annular ring formed by the disk 106. The disk 108 may form, in one example, a lower surface of the body 102. In one example, the arial disk 100 may be implemented having a discus shape. The surfaces of the body 102 and the disks 104, 106 and 108 may be configured to provide aerodynamic lift. The aerodynamic lift may be enhanced by rotating the disks 104, 106 and 108.

The disks 104, 106, and 108 may, alone or in combination, rotate and/or remain stationary relative to the body 102. In one example, one or more of the disks 104, 106, and 108 may rotate in the same or opposite directions relative to the body 102. Each of the disks 104, 106, and 108 may rotate at a speed similar to or different from another of the disks. The shape and/or rotation of the disks 104, 106, and 108 may be configured to provide lift to the aircraft 100 in accordance with the Bernoulli effect, the Coanda effect, and/or other aerodynamic principles.

The rotation of the disks 104, 106, and 108 may be configured to provide gyroscopic precessional forces to the aircraft 100. The direction and/or speed of the rotation of the disks 104, 106, and 108 may control torque reaction of the aircraft 100. In one example, the direction and/or speed of rotation of the disks 104 and/or 108 may counteract the torque reaction of the aircraft 100 to rotation of the disk 106. The direction and/or speed of the rotation of the disks 104, 106, and 108 may provide improved lift, stability, and/or maneuverability to the aircraft 100 when compared to conventional aircraft.

The body 102 may comprise, in one example, a fuselage 120, a tail section 122, a pair of wings 124a and 124b, a connector section 126, a lower section 128, a plurality of bearings 130a–130n, one or more annular bearing rings 132a–132b, and one or more seal rings 134a–134n.

The tail section 122 and the wings 124a and 124b may be connected to an upper surface of the fuselage 120. The tail section 122 and the wings 124a and 124b are generally oriented horizontally on the fuselage 120 in a t-shaped configuration. However, the wings 124a and 124b may be swept back accordingly to meet the design criteria of a particular application. The improved lift provided by the disks 104, 106, and 108 may permit the wings 124a and 124b to be swept back further than in conventional winged aircraft design. When the wings 124a and 124b are swept back, the aircraft 100 may have reduced drag and/or improved economy.

The improved lift and control provided by the disks 104, 106 and 108 may permit the aircraft 100 to be implemented with the wings 124a and 124b having a low maximum fore-aft width to wingspan ratio (e.g., the leading edge and the trailing edge of the wings 124a and 124b may be more nearly parallel than in conventional aircraft). In one example, the maximum fore-aft width to wingspan ratio for the wings 124a–124b may be 0.065. However, modifications of the maximum fore-aft width to wingspan ratio for the wings 124a–124b, such as in a range of 0.02 to 0.10 may be implemented to meet the design criteria of a particular application. When the wings 124a and 124b are implemented with a low maximum fore-aft width to wingspan ratio, the aircraft 100 may have reduced draft and/or improved economy.

The connector section 126 may be oriented vertically. In one example, the connector section 126 may be cylindrically shaped. The connector section 126 may be located at the center of the body 102. The connector section 126 may be configured to rigidly interconnect the fuselage 120 to the lower section 128. In another example, the body 102 may be implemented with the fuselage 120, the connector section 126. and the lower section 128 as a one-piece structure. The body 102 may be implemented having a dumbbell shape.

In one example, the plurality of bearings 130a–130n may be positioned between the disks 104, 106, and 108 and the body 102. The bearings 130a–130n are generally located in bearing races formed at interfacing surfaces of the body 102 and the disks 104, 106 and 108. The bearings 130a–130n may provide friction reduction, constraint and/or support at the interfacing surfaces between the body 102 and the disks 104, 106, and 108. The bearings 130a–130n may be implemented as ball bearings. However, any suitable type of bearing (e.g., roller, needle, tapered, etc.) may be implemented accordingly to meet the design criteria of a particular application.

The annular bearing ring 132a may be positioned in grooves formed in the lower surface of the fuselage 120 and the upper surface of the disk 106. The annular bearing ring 132b may be positioned in grooves formed in the lower surface of the disk 106 and an upper surface of the lower section 128. In one example, the annular bearing rings 132a and 132b may be implemented as dual caged ball bearings. However, any suitable type of bearings may be implemented accordingly to meet the design criteria of a particular application. The annular bearing rings 132a and 132b may provide friction reduction, constraint, and/or support at the interfacing surfaces between the body 102 and the disk 106. In another example, the aircraft 100 may be implemented without the annular bearing rings 132a and 132b.

In one example, the body 102 may be implemented with three seal rings 134a–134c. The seal rings 134a–134c may be implemented at the periphery of the interfaces between the body 102 and the disks 104 and 106. The seal ring 134a may be mounted on the upper surface of the fuselage 120. The seal ring 134b may be mounted on a lower surface of the fuselage 120. The seal ring 134c may be mounted on the upper surface of the lower section 128. In one example, the seal rings 134a–134c may be implemented as dynamic lip seals. However, any suitable seal design and mounting may be implemented accordingly to meet the design criteria of a particular application. The seal rings 134a–134c may enhance the aerodynamics of the aircraft 100.

The fuselage 120 may comprise a cockpit area 140, a passenger/cargo area 142, one or more engines 144a–144n and one or more fuel tanks 146a–146n. In one example, two engines 144a and 144b may be mounted to the upper surface of the fuselage 120 and two engines 144c and 144d may be mounted to a lower surface of the lower section 128. In one example, one or more fuel tanks 146a–146n may be positioned internal to the fuselage 120 and adjacent to the engines 144a and 144b. The cockpit area 140 is generally located on the upper surface of the fuselage 120 opposite the tail section 122. In one example, the passenger/cargo area 142 may be configured to carry a plurality of passengers and/or cargo. A plurality of windows in the cockpit area 140 and the passenger/cargo area 142 may provide viewing for the aircraft 100 flight crew and/or passengers. The engines 144a–144n may be oriented substantially longitudinally on the upper surface of the fuselage 120 and the lower surface of the lower section 128 to provide thrust along a horizontal axis of the aircraft 100. In one example, the engines 144a–144n may be turbojet engines. However, any suitable engine type (e.g., turboprop, etc.) may be implemented accordingly to meet the design criteria of a particular application. In one example, the fuselage 120 may be substantially disk shaped. However, other shapes may be implemented accordingly to meet the design criteria of a particular application.

The tail section 122 may comprise, in one example, a rudder 150, a rear wing 152, and one or more elevators 154a and 154b. The rudder 150 is generally oriented vertically. The rudder 150 may be configured to rotate about a vertical axis. The rudder 150 may be configured to provide steering control to the aircraft 100. The rear wing 152 may be oriented horizontally. The elevators 154a and 154b may be coupled to a rear edge of the rear wing 152. The elevators 154a and 154b may be configured to rotate in a vertical arc. The elevators 154a and 154b may be configured to provide steering and/or ascent/descent control to the aircraft 100.

The wings 124a and 124b may comprise, in one example, a plurality of ailerons 160a–160n. In one example, the wings 124a and 124b may comprise four ailerons 160a–160d. The ailerons 160a and 160b may be coupled to a rear edge of the wing 124a and the ailerons 160c and 160d may be coupled to a rear edge of the wing 124b. The ailerons 160a–160d may be configured to rotate in a vertical arc. The ailerons 160a–160d may be configured to provide steering and/or ascent/descent control.

The connector 126 may comprise one or more nested shaft segments 170a–170n and a bolt 172. In one example, the connector 126 may comprise five nested shaft segments 170a–170e. The shaft segments 170a, 170c, and 170e may be coupled to the disks 104, 106, and 108, respectively, to provide forces to rotate the disks 104, 106, and 108. The segment 170c may be configured, in one example, to provide additional support to the interconnection between the fuselage 120 and the lower section 128. The disks 104, 106, and 108 may rotate about an axis at the center of the connector 126. The bearings 130a–130n may be positioned at the connector 126 to provide support, alignment, and/or friction reduction at the interfaces between the shaft segments 170a–170e and the body 102 and the disks 104, 106, and 108. In one example, the bolt 172 may be implemented to connect the disk 104 to the shaft segment 170a. However, any suitable connection may be implemented accordingly in order to meet the design criteria of a particular application.

The lower section 128 may, in one example, comprise engines 144c–144d, fuel tanks 146c–146d, a motor 180, gearing/coupling apparatus 182a–182b, and a plurality of landing gear assemblies 184a–184n. In one example, the lower section 128 may comprise three landing gear assemblies 184a–184c. The engines 144c and 144d may be implemented on the lower surface of the lower section 128 similarly to the engines 144a and 144b. The fuel tanks 146c and 146d may be implemented internal to the lower section 128 adjacent to the engines 144c and 144d, respectively, similarly to the fuel tanks 146a and 146b. In one example, the lower section 128 may be substantially disk shaped. However, other suitable shapes may be implemented to meet the design criteria of a particular application.

The motor 180 may be located internally to the lower section 128. The motor 180 may be coupled directly or through the gearing/coupling apparatus 182a–182b to the disks 104, 106 and/or 108, and/or the shaft segments 170a–170c. The gearing/coupling apparatus 182a–182b may be implemented as mechanical, electrical, magnetic, hydraulic, viscous, or other gearing/coupling accordingly in order to meet the design criteria of a particular application. In one example, the motor 180 may be implemented as an internal combustion engine. However, the engine 180 may be implemented as any suitable apparatus to provide rotational force (e.g., hydraulic pump/motor, electric motor, etc.) accordingly to meet the design criteria of a particular application. When the engine 180 is implemented as an electric motor, backup power (e.g., battery power, etc.) may be provided to ensure that the aircraft 100 may maintain flight and/or land safely when primary power is lost. In another example, the aircraft 100 may be implemented without the engine 180 and power may be transferred from one or more of the engines 144.

The landing gear assemblies 184a–184c may be located at substantially equal intervals on a lower surface of the lower section 128. However, the spacing of the landing gear assemblies 184a–184c may be selected to provide balance and support to the aircraft 100 when the aircraft 100 is on a landing area. The landing gear assemblies 184a–184c may be retractable into the lower section 128. The landing gear assemblies 184a–184c may be located on the lower section 128 such that the disk 108 may rotate when the landing gear assemblies 184a–184c are either extended or retracted.

The disk 104 is generally domed shaped. The disk 104 may be oriented, in one example, with an upper convex surface and a substantially flat lower surface adjacent to the upper surface of the fuselage 120. The disk 104 may be hollow. In one example, the disk 104 may be filled with one or more lighter than air gasses (e.g., helium, etc.). The lighter than air gas contained within the disk 104 may provide lift to the aircraft 100. In alternative examples, the disk 104 may be filled with air, one or more inert gasses (e.g., nitrogen, argon, etc.), and/or a light weight foam. The disk 104 may provide a crush zone and/or a cushioning effect for reduced damage in the event of a crash. The disk 104 may provide buoyancy in the event the aircraft 100 lands on water.

The disk 106 is generally an external disk that has a periphery external to the fuselage 120 and the lower section 128. The disk 106 may comprise a plurality of chambers 190a–190n, a plurality of scoops 200a–200n, a plurality of scoops 202a–202n, and a plurality of scallops 204a–204n. The chambers 190a–190n may be formed by outer walls of the disk 106 and one or more supports/bulkheads 210a–210n. The chambers 190a–190n may be filled with one or more lighter than air gasses (e.g., helium, etc.).

The scoops 200a–200n may be located radially near an outboard edge on the upper surface of the disk 106. The scoops 200a–200n may be shaped to provide greater lift than provided by a substantially smooth surface. The scoops 202a–202n may be located radially near the outboard edge on the lower surface of the disk 106. The scoops 202a–202n may be shaped to provide greater lift than provided by a substantially smooth surface. In one example, the scoops 200a–200n and/or the scoops 202a–202n may be circular. In another example, the scoops 200a–200n and/or the scoops 202a–202n may have an oval shaped cross-section. However, any suitable shape may be implemented accordingly to meet the design criteria of a particular application. In one example, the scoops 200a–200n and the scoops 202a–202n may communicate to form a plurality of ducts. The ducts may be formed between combinations of the scoops 200a–200n and/or the scoops 202a–202n.

The scallops 204a–204n may be located radially near the outboard edge on the lower surface of the disk 106. The scallops 204a–204n may be shaped to provide greater lift than provided by a substantially smooth surface. In one example, the scallops 204a–204n may be tear-drop shaped with a larger end positioned at the periphery of the disk 106. In another example, the scallops 204a–204n may be approximately sinusoidal wave shaped. However, any suitable shape may be implemented accordingly to meet the design criteria of a particular application. In one example, the scallops 204a–204n may be configured to interact with the scoops 200a–200n and/or the scoops 202a–202n to provide additional lift.

The disk 108 may be implemented similarly to the disk 104. The disk 104 may be oriented, in one example, with a lower convex surface and a substantially flat upper surface adjacent to the lower surface of the lower section 128. The disk 108 may provide a crush zone and/or a cushioning effect when the aircraft 100 crashes in an upright position. In one example, the disk 108 may be optional.

In one example, the crash detection apparatus 110 may be implemented as a manual control located in the cockpit area 140 that may be activated by the aircraft 100 flight crew (e.g., pilot, copilot, etc). In another example,. the crash detection apparatus 110 may be implemented as an automatic readout and/or control from suitable sensors (e.g., accelerometers, airspeed indicators, radar, sonar, etc.) implemented in the aircraft 100 accordingly to meet the design criteria of a particular application and/or computational devices interacting with the sensors. The automatic crash detection apparatus 110 may alert the flight crew to conditions that may result in a crash. The crash detection apparatus 110 may be configured to control rotation of the disks 104, 106, and/or 108. The rotation of the disks 104, 106, and/or 108 may enhance the stability, enhance the control, and provide lift to the aircraft 100. The rotation of the disks 104, 106, and/or 108 may be controlled to allow the aircraft 100 to hover, reduce the rate of descent, and/or provide a soft landing.

During an example operation, the aircraft 100 may be flown as a conventional winged aircraft. The disks 104, 106, and 108 may be stationary. When not rotating, the shape of the body 102, and the disks 104, 106, and 108 may provide greater lift than conventional winged aircraft. In another example operation, the disks 104, 106, and/or 108 may be rotated to provide control, stability, and/or lift during various flight conditions (e.g., normal flight, turbulence, wind shear, etc.). The body 102 is generally stationary relative to the disks 104, 106, and 108. The disks 104, 106, and/or 108 may be rotated to provide control, stability, and/or lift during takeoff and/or landing. The aircraft 100 may require less runway length than a conventional winged aircraft.

In an example operation, when the crash detection apparatus 110 detects an imminent crash, the disks 104, 106, and/or 108 may be controlled to (i) start rotating, (ii) stop rotating, (iii) increase/decrease rotational speed, and/or (iv) change the direction of rotation in order to achieve a controlled descent. In one example, the controlled descent may comprise reduced airspeed, stabilized flight (e.g., reduction of roll, pitch, yaw, etc.), gradual descent, and/or soft landing.

Figure 3A:
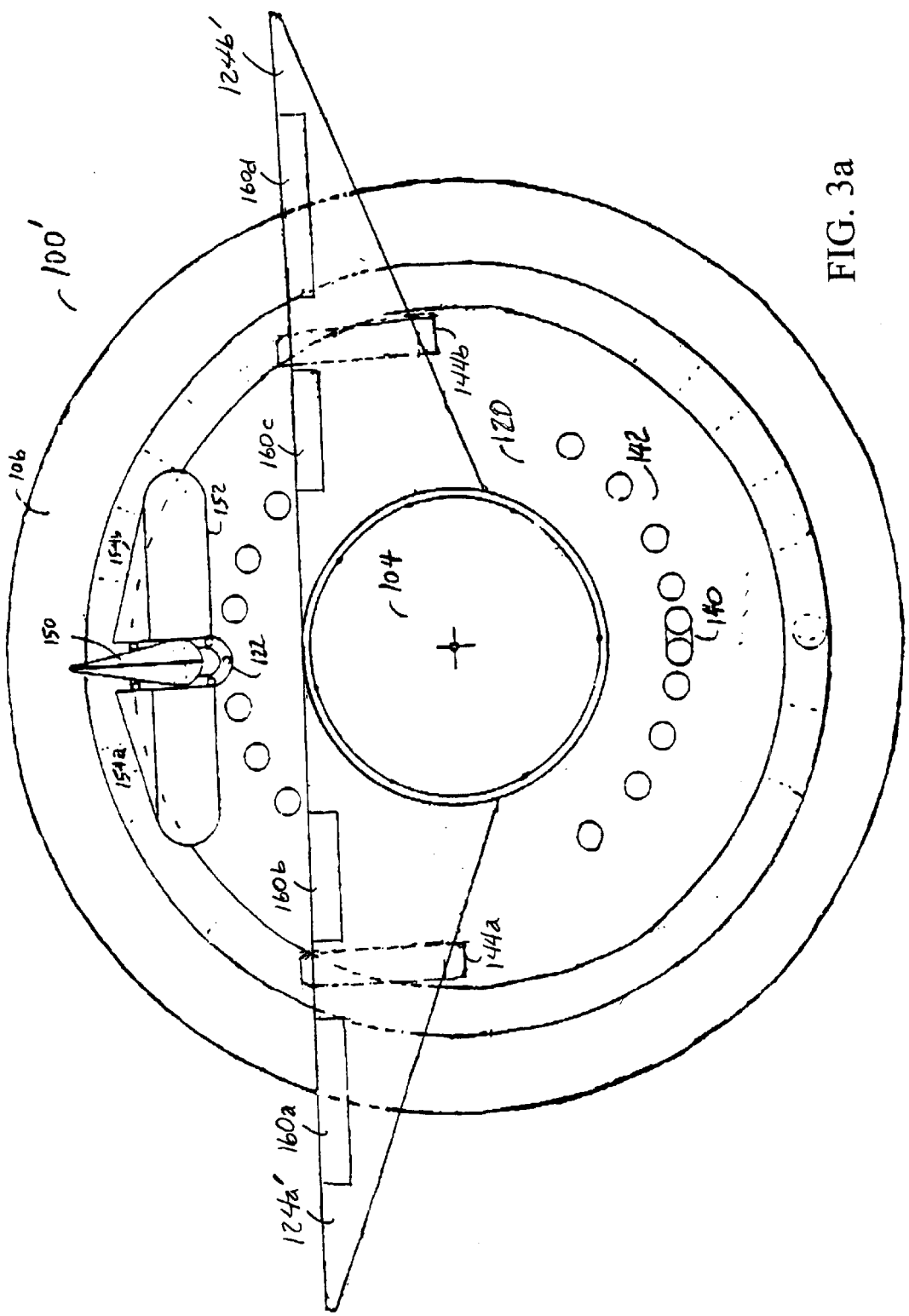
FIGS. 3a and 3b are diagrams illustrating top views of alternative embodiments of the present invention.

Referring to FIG. 3a, a diagram illustrating a top view of an alternative embodiment of the aircraft 100 is shown. In one example, the aircraft 100' may comprise a pair of wings 124a' and 124b'. The wings 124a' and 124b' may be implemented similarly to the wings 124a and 124b. However, in one example, the wings 124*a*' and 124*b*' may be implemented having a partially swept back leading edge and a maximum fore-aft width to wingspan ratio of 0.15 (e.g., the wings 124*a*' and 124*b*' may be partial delta wings). However, modifications of the maximum fore-aft width to wingspan ratio for the wings 124*a*' and 124*b*', such as in a range of 0.10 to 0.20 may be implemented to meet the design criteria of a particular application. The partial delta wings 124*a*' and 124*b*' may cooperate with the shape of the aircraft 100' and/or the rotation of the disks 104, 106 and 108 to provide improved stability, control and/or lift to the aircraft 100'.

Figure 3B:
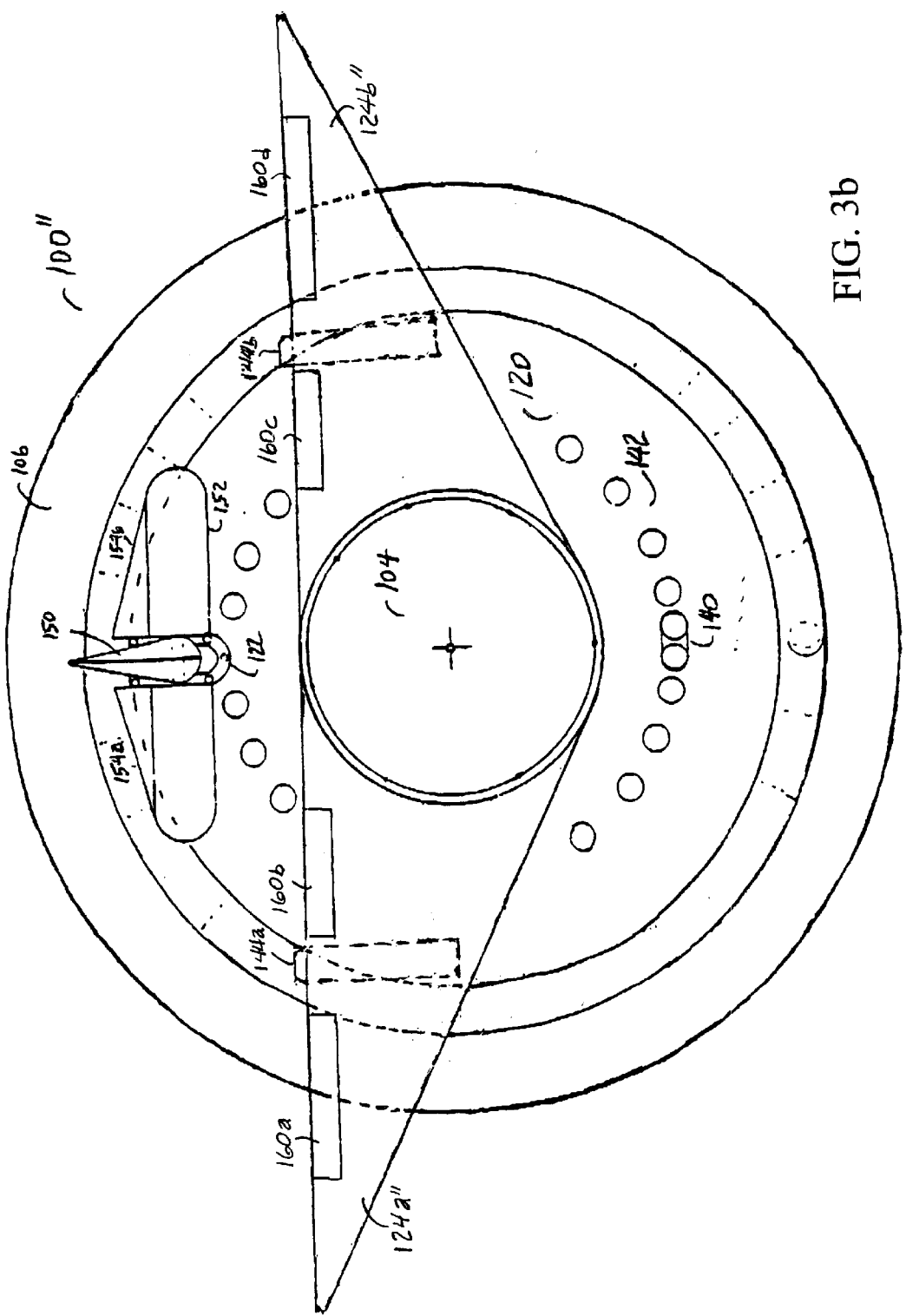

Referring to FIG. 3*b*, a diagram illustrating a top view of another alternative embodiment of the aircraft 100 is shown. In one example, the aircraft 100" may comprise a pair of wings 124*a*" and 124*b*". The wings 124*a*" and 124*b*" may be implemented similarly to the wings 124*a* and 124*b*. However, in one example, the wings 124*a*" and 124*b*" may be implemented having a swept back leading edge and a maximum fore-aft width to wingspan ratio of 0.22 (e.g., the wings 124*a*" and 124*b*" may be delta wings). However, modifications of the maximum fore-aft width to wingspan ratio for the wings 124*a*" and 124*b*", such as in a range of 0.20 or higher may be implemented to meet the design criteria of a particular application. The delta wings 124*a*" and 124*b*" may cooperate with the shape of the aircraft 100" and/or the rotation of the disks 104, 106 and 108 to provide further improved stability, control and/or lift to the aircraft 100".

In other alternative embodiments of the aircraft 100, a fewer or greater number of disks may be implemented to meet the design criteria of a particular application. However, at least two disks are generally implemented. When implemented with more than three disks, the aircraft 100 may have further increased lift, maneuverability, and/or stability when compared to conventional aircraft.

In one alternative example, the aircraft 100 may be implemented as a disk aircraft (e.g., without the tail section 122 and the wings 124). In one embodiment, the aircraft 100 may be implemented as a toy. The toy implementation of the aircraft 100 may be implemented similarly to the full size aircraft 100 embodiments.

While the invention has been particularly shown and described with reference to the preferred embodiments thereof, it will be understood by those skilled in the art that various changes in form and details may be made without departing from the spirit and scope of the invention.

What is claimed is:

1. An aircraft comprising:
    a body; and
    a plurality of disks rotatably coupled to said body, wherein said disks are configured to (a) (i) rotate in the same direction in a first mode and (ii) in different directions in a second mode and (b) provide lift and stability to flight of said aircraft.

2. The aircraft according to claim 1, wherein said aircraft further comprises a crash detection apparatus configured to control descent of said aircraft when an imminent crash is detected.

3. The aircraft according to claim 1, wherein said plurality of disks comprise (i) a first dome shaped disk coupled to an upper surface of said body, (ii) a second dome shaped disk coupled invertedly to a lower surface of said body, and (iii) an annular ring shaped disk, wherein said body is coupled centrally within said annular ring shaped disk.

4. The aircraft according to claim 3, wherein said annular ring shaped disk further comprises a plurality of scoops configured to provide lift.

5. The aircraft according to claim 4, wherein said plurality of scoops are located on an upper surface and a lower surface of said annular ring shaped disk.

6. The aircraft according to claim 4, wherein two or more of said plurality of scoops are configured to communicate to form ducts configured to provide lift.

7. The aircraft according to claim 3, wherein said annular ring shaped disk further comprises a plurality of scallops located on a lower surface of said annular ring shaped disk and said plurality of scallops are configured to provide lift.

8. The aircraft according to claim 1, wherein said body comprises a fuselage section configured to carry a plurality of passengers and cargo, a lower section configured to house landing gear, and a connector section configured to connect said fuselage section to said lower section.

9. The aircraft according to claim 1, wherein said body comprises a wing section having a plurality of ailerons and a tail section having a rudder and one or more elevators.

10. The apparatus according to claim 2, wherein said disks are configured to rotate at different speeds.

11. The aircraft according to claim 3, wherein said first and second dome shaped disks are filled with light weight foam.

12. The aircraft according to claim 1, wherein said aircraft is substantially discus shaped.

13. The aircraft according to claim 1, wherein said aircraft further comprises a shaft section configured to transfer rotational forces to said plurality of disks.

14. The aircraft according to claim 1, wherein said aircraft comprises a plurality of bearings configured to provide support and reduce friction between said body and said plurality disks.

15. The aircraft according to claim 14, wherein one or more of said plurality of bearings is an annular ring bearing.

16. The aircraft according to claim 1, wherein said aircraft comprises one or more engines configured to provide thrust.

17. A method of providing lift and stability to flight of an aircraft comprising the steps of:
    (A) coupling a plurality of rotatable disks to a body of said aircraft; and
    (B) rotating said disks (i) in the same direction in a first mode and (ii) in different directions in a second mode.

18. The method according to claim 17, wherein said method further comprises the steps of:
    detecting when a crash of said aircraft is imminent; and
    controlling descent of said aircraft.

19. An apparatus for providing lift and stability to flight of an aircraft comprising:
    (A) means for coupling a plurality of rotatable disks to a body of said aircraft; and
    (B) means for rotating said disks (i) in the same direction in a first mode and (ii) in different directions in a second mode.

20. The aircraft according to claim 10, wherein said crash detection apparatus is configured to control direction and speed of rotation of said plurality of disks.

21. The method according to claim 17, wherein step (B) comprises rotating said disks at different speeds.

* * * * *